US010126743B2

(12) United States Patent
Fukumoto (10) Patent No.: US 10,126,743 B2
(45) Date of Patent: Nov. 13, 2018

(54) VEHICLE NAVIGATION ROUTE SEARCH SYSTEM, METHOD, AND PROGRAM (71) Applicant: AISIN AW CO., LTD., Anjo-shi, Aichi-ken (JP)

(72) Inventor: Masataka Fukumoto, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 3 days.

(21) Appl. No.: 15/116,377

(22) PCT Filed: Jan. 27, 2015

(86) PCT No.: PCT/JP2015/052128
§ 371 (c)(1),
(2) Date: Aug. 3, 2016

(87) PCT Pub. No.: WO2015/129366
PCT Pub. Date: Sep. 3, 2015

(65) Prior Publication Data
US 2017/0010613 A1 Jan. 12, 2017

(30) Foreign Application Priority Data
Feb. 25, 2014 (JP) ................................ 2014-034517

(51) Int. Cl.
*G01C 22/00* (2006.01)
*G05D 1/00* (2006.01)
(Continued)

(52) U.S. Cl.
CPC ....... *G05D 1/0088* (2013.01); *G01C 21/3453* (2013.01); *G01C 21/3492* (2013.01); *G08G 1/096827* (2013.01); *G08G 1/096844* (2013.01)

(58) Field of Classification Search
CPC ....... G05D 1/0088; G01C 21/34; G01C 21/32
(Continued)

(56) References Cited

U.S. PATENT DOCUMENTS 7,031,829 B2 4/2006 Nisiyama
2004/0068366 A1* 4/2004 Nisiyama ........... G01C 21/3461
701/25
(Continued)

FOREIGN PATENT DOCUMENTS

JP H11-51682 A 2/1999
JP 2001-330459 A 11/2001
(Continued)

OTHER PUBLICATIONS

English Translation for JP2001330459A.*
English Translation for JP2011257168A.*

*Primary Examiner* — Mahmoud S Ismail
(74) *Attorney, Agent, or Firm* — Oliff PLC (57) ABSTRACT A vehicle navigation route search system, method, and program search for a recommended route in the case where a vehicle travels by autonomous driving control in an autonomous driving section where autonomous driving control of the vehicle is permitted. The system, method, and program calculate a cost value by using a cost table for autonomous driving control which is set such that a route that is more suitable for traveling by autonomous driving control has a lower cost value, and search for the recommended route based on the calculated cost value.

11 Claims, 6 Drawing Sheets (51) Int. Cl.
*G08G 1/0968* (2006.01)
*G01C 21/34* (2006.01)
G01C 21/30 (2006.01)
G01C 21/32 (2006.01)

(58) Field of Classification Search
USPC .................................................. 701/26, 209
See application file for complete search history.

(56) References Cited

U.S. PATENT DOCUMENTS

2007/0005240 A1* 1/2007 Oumi ................. G01C 21/3484
 701/425
2011/0066312 A1 3/2011 Sung et al.
2014/0316635 A1 10/2014 Bando et al.

FOREIGN PATENT DOCUMENTS

| JP | 2001330459 A | * | 11/2001 |
| JP | 2004-125726 A | | 4/2004 |
| JP | 2007-010571 A | | 1/2007 |
| JP | 2011-257168 A | | 12/2011 |
| JP | 2011257168 A | * | 12/2011 |
| WO | 2013/069054 A1 | | 5/2013 |

* cited by examiner

| ELEMENT | AUTONOMOUS DRIVING COST TABLE | MANUAL DRIVING COST TABLE |
|---|---|---|
| ROAD WIDTH COST | × | ○ |
| NUMBER-OF-LANES COST | × | ○ |
| BRANCH COST | ○ | ○ |
| DISTANCE COST | ○ (LOW PROPORTION) | ○ |
| TRAFFIC JAM COST | ○ (LOW PROPORTION) | ○ |
| ROAD ATTRIBUTE (EXCLUSIVE LANE) COST | ○ (ESPECIALLY LOW WHEN EXCLUSIVE LINE FOR AUTONOMOUS DRIVING IS INCLUDED) | ○ |
| LANE CHANGE COST | ○ (HIGH PROPORTION) | ○ |
| CURVE CURVATURE COST | ○ | × |
| CONSTRUCTION PERIOD COST | ○ | × |
| TRAFFIC VOLUME COST | ○ | × |
| . . . | . . . | . . . |

○ · · · CONSIDERED
× · · · NOT CONSIDERED

FRESHLY PAVED ROAD

PAVEMENT MARKINGS
DETERIORATED OVER TIME

VEHICLE NAVIGATION ROUTE SEARCH SYSTEM, METHOD, AND PROGRAM

TECHNICAL FIELD

Related technical fields include route search systems, methods, and programs that search for a recommended route in an autonomous driving section where autonomous driving control of a vehicle is permitted.

BACKGROUND ART

In recent years, many vehicles are equipped with navigation systems that provide the driver with travel guidance of the vehicle so that the driver can easily arrive at a desired destination. The navigation systems are systems that can detect the current location of the vehicle by a GPS receiver etc. and obtain map data corresponding to the detected current location via a recording medium such as a DVD-ROM or an HDD or via a network to display the map data on a liquid crystal display monitor. The navigation systems also have a route search function to search for, when a desired destination is entered, a recommended route from the location of the vehicle to the destination. When the searched recommended route is set as a guide route, the navigation systems display the guide route on a display screen and provide the user with voice guidance when the vehicle approaches an intersection etc., thereby reliably guiding the user to the desired destination. Recently, some mobile phones, smartphones, tablet computers, personal computers, etc. also have a function similar to that of the navigation systems.

In recent years, in addition to a manual drive mode in which the vehicle travels based on user's driving maneuvers, a drive mode using autonomous driving control has been proposed as a new drive mode, in which the vehicle autonomously travels along a preset route without user's driving maneuvers. For example, in autonomous driving control, the current location of the vehicle, the lane in which the vehicle is traveling, and the position of other vehicles around are detected as needed, and vehicle control such as control of steering, a driving source, and a brake is autonomously performed such that the vehicle travels along a present route. The drive mode using autonomous driving control is advantageous in that it can reduce the burden of driving on the user. In some situations, however, it is difficult for the vehicle to travel by autonomous driving control, depending on the road condition. Examples of such situations include a situation where the vehicle goes around a sharp curve where it is difficult to detect surroundings by a camera or a sensor, a situation where the vehicle travels in a road section with a deteriorated pavement marking, and a situation where the vehicle makes frequent lane changes.

It is therefore desired that the navigation systems etc. search for a recommended route in view of the level of suitability for traveling by autonomous driving control. For example, Japanese Patent Application Publication No. 2004-125726 (JP 2004-125726 A) (pages 6 to 7, FIG. 5) proposes a technique in which, if "use autonomous drive roads" is selected as a preference for a search condition, the navigation system searches for a route preferentially including an autonomous drive road by multiplying route cost of a part corresponding to an autonomous drive road where the vehicle travels by autonomous driving control, such as an exclusive automobile road, by a coefficient smaller than 1.

SUMMARY

In the technique of JP 2004-125726 A, it is possible to make autonomous drive roads more likely to be included in a route by multiplication by the coefficient, but the navigation system basically conducts such a route search by using the same cost table as that for normal route searches. The navigation system therefore cannot conduct such a route search in view of the level of suitability for traveling by autonomous driving control. For example, even a route including many autonomous drive road sections is not suitable for traveling by autonomous driving control as described above if it has many sharp curves or if it requires frequent lane changes. In Patent Document 1, however, such a route may be selected as a recommended route, which results in an event that is disadvantageous for the user, such as an interruption of traveling by autonomous driving control.

Exemplary embodiments of the broad inventive principles described herein solve the above conventional problem, and provide a route search system that can conduct a route search in view of the level of suitability for traveling by autonomous driving control, a route search method, a computer program, and a data structure of a cost table that is used for route searches.

In order to achieve the above object, exemplary embodiments provide systems, methods, and programs that calculate a cost value by using a cost table for autonomous driving control which is set such that a route that is more suitable for traveling by autonomous driving control has a lower cost value, and search for the recommended route based on the calculated cost value.

A data structure of a cost table according to an embodiment is a data structure of a cost table that is used to calculate a cost value as an index for selection of a recommended route when searching for the recommended route in the case where a vehicle travels by autonomous driving control in an autonomous driving section where autonomous driving control of the vehicle is permitted, characterized by including: a plurality of elements for calculating the cost value, wherein a sum of values specified for each of the elements is calculated as the cost value, and the plurality of elements include an autonomous driving determination element for determining if a route is suitable for traveling by autonomous driving control.

According to the route search system, the route search method, and the computer program having the above configuration, a route search can be conducted in view of suitability for traveling by autonomous driving control. As a result, a recommended route can be provided which allows the vehicle to travel by autonomous driving control and which prevents an event disadvantageous for the user, such as an interruption of autonomous driving control, from occurring.

According to the data structure of the cost table, the user of the cost table allows a route search to be conducted in view of suitability for traveling by autonomous driving control. As a result, a recommended route can be provided which allows the vehicle to travel by autonomous driving control and which prevents an event disadvantageous for the user, such as an interruption of autonomous driving control, from occurring.

DETAILED DESCRIPTION OF EXEMPLARY EMBODIMENTS

Figure 1:
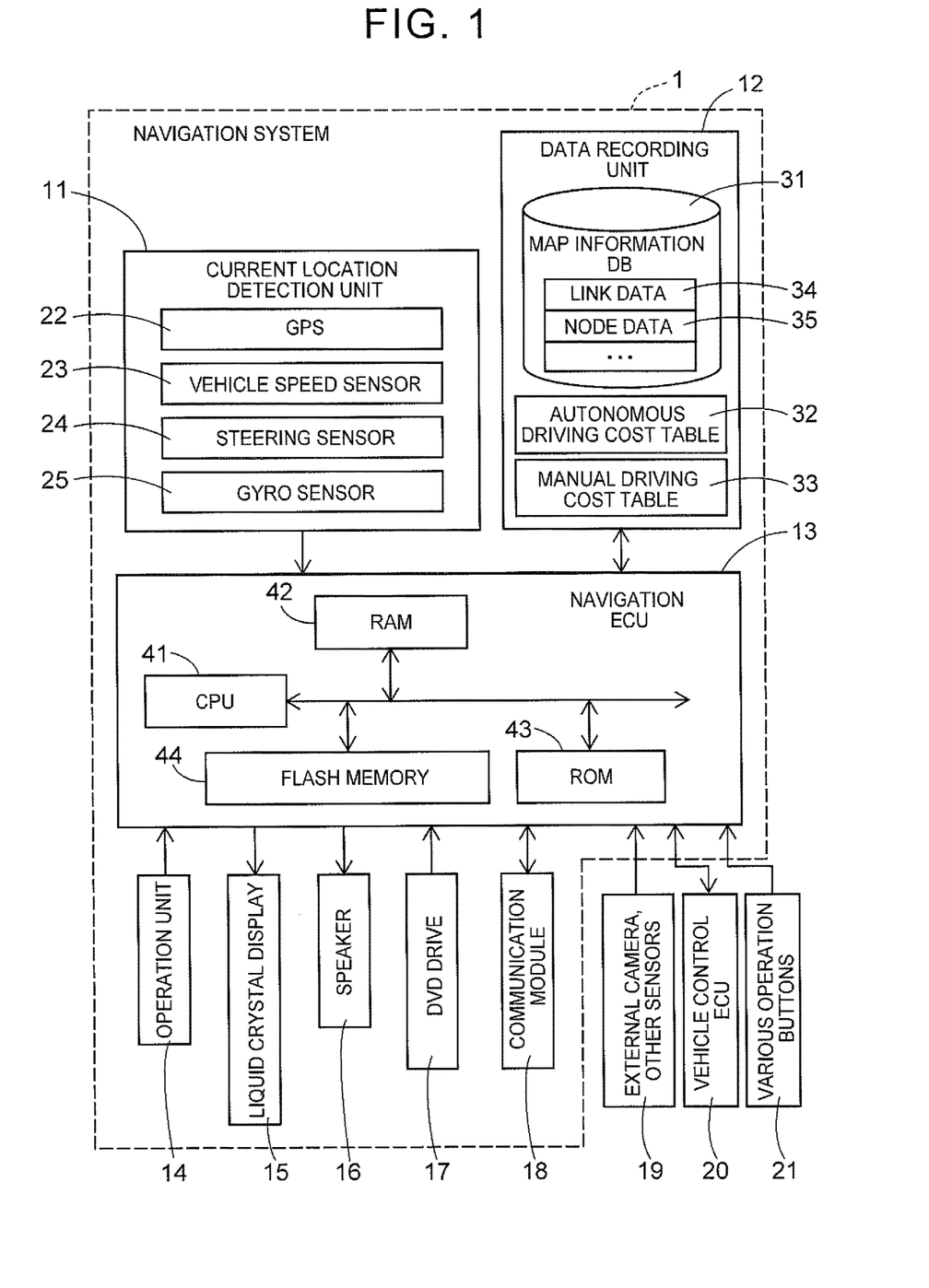
FIG. 1 is a block diagram showing the configuration of a navigation system according to an embodiment.

A route search system will be described in detail below based on an embodiment of a navigation system with reference to the accompanying drawings. First, the general configuration of a navigation system 1 according to the embodiment will be described with reference to FIG. 1. FIG. 1 is a block diagram of the navigation system 1 of the embodiment.

As shown in FIG. 1, the navigation system 1 of the embodiment is formed by: a current location detection unit 11 that detects the current location of a vehicle equipped with the navigation system 1; a data recording unit 12 having various data recorded thereon; a navigation ECU 13 that performs various arithmetic operations based on received information; an operation unit 14 that accepts user's operation; a liquid crystal display 15 that displays to the user a map around the vehicle, information on a route searched for by a route search process described below; a speaker 16 that outputs voice guidance for route guidance; a DVD drive 17 that reads a DVD, or a storage medium; and a communication module 18 that communicates with an information center such as a probe center or a Vehicle Information and Communication System (VICS (registered trademark)) center. The navigation system 1 is connected via an in-vehicle network such as a CAN to an external camera 19 and various sensors which are mounted on the vehicle equipped with the navigation system 1. The navigation system 1 is also connected to a vehicle control ECU 20 that performs various controls on the vehicle equipped with the navigation system 1, such that the navigation system 1 and the vehicle control ECU 20 can communicate with each other in two ways. The navigation system 1 is also connected to various operation buttons 21 mounted on the vehicle, such as an autonomous driving switch and an autonomous driving start button described below.

Components of the navigation system 1 will be sequentially described below.

The current location detection unit 11 is formed by a GPS 22, a vehicle speed sensor 23, a steering sensor 24, a gyro sensor 25, etc. and can detect the current location and direction of the vehicle, the traveling speed of the vehicle, the current time, etc. In particular, the vehicle speed sensor 23 is a sensor that detects the distance traveled by the vehicle and the vehicle speed. The vehicle speed sensor 23 generates pulses according to rotation of drive wheels of the vehicle and outputs a pulse signal to the navigation ECU 13. The navigation ECU 13 counts the number of generated pulses to calculate the rotational speed of the drive wheels and the traveled distance. The navigation system 1 need not necessarily include all of these four sensors. The navigation system 1 may include only one or more of these sensors.

The data recording unit 12 includes a hard disk (not shown) as an external storage device and as a storage medium, and a recording head (not shown) that is a driver for reading a map information DB 31, an autonomous driving cost table 32, a manual driving cost table 33, a predetermined program, etc. recorded on the hard disk and for writing predetermined data on the hard disk. (As used herein the terms "storage medium" and storage media" are not intended to encompass transitory signals.) The data recording unit 12 may be formed by a memory card or an optical disk such as a CD or a DVD instead of the hard disk. The map information DB 31, the autonomous driving cost table 32, and the manual driving cost table 33 may be stored in an external server, and the navigation system 1 may communicate with the external server to obtain the map information DB 31, the autonomous driving cost table 32, and the manual driving cost table 33.

The map information DB 31 is storage means having stored therein, e.g., link data 34 relating to roads (links), node data 35 relating to node points, facility data relating to facilities, map display data for displaying a map, intersection data relating to each intersection, search data for searching for locations, etc.

Data that is recorded as the link data 34 is: data on each link that forms a road to which the link belongs, namely data indicating the width, slope, cant, and bank of the road, the road surface condition, a merging section, the number of lanes on the road, the location where the number of lanes decreases, the location where the road width decreases, a railroad crossing, etc.; data on a corner, namely data indicating the radius of curvature, an intersection, a T-junction, the entrance and exit of the corner, etc.; data on road attributes, namely data indicating a downhill road, an uphill road, etc.; and data on road type, namely data indicating a local road such as a national highway, a prefectural road, or a narrow street, and a toll road such as a national expressway, an urban expressway, an exclusive automobile road, a local toll road, or a toll bridge.

Data that is recorded as the node data 35 include data on: a branch point (including an intersection, a T-junction, etc.) of an actual road; the coordinates (positions) of node points set at predetermined intervals on each road according to the radius of curvature etc.; node attributes indicating whether the node is a node corresponding to an intersection or not etc.; a connection link number list, or a list of link numbers of links connecting to the node; an adjacent node number list, or a list of node numbers of nodes located adjacent to the node with a link therebetween; and the height (altitude) of each node point.

The autonomous driving cost table 32 and the manual driving cost table 33 are tables that are used to calculate a cost value as an index for route selection in a route search process of searching for a route from a point of departure (e.g., the current location of the vehicle) to a set destination as described below.

Drive modes of the vehicle include an autonomous drive mode using autonomous driving control in which the vehicle autonomously travels along a preset route without user's driving maneuvers, in addition to a manual drive mode in which the vehicle travels based on user's driving maneuvers. For example, in autonomous driving control, the current location of the vehicle, the lane in which the vehicle is traveling, and the location of other vehicles around are detected as needed, and vehicle control such as control of steering, a driving source, and a brake is autonomously performed by the vehicle control ECU 20 such that the vehicle travels along a preset route. Since autonomous driving control is already known in the art, detailed description thereof will be omitted. Autonomous driving control may be performed in all road sections. In the following description, however, a freeway having gates (either manned or unmanned, and either toll or toll-free) at boundaries with other roads connecting to the freeway is set as an autonomous driving section where autonomous driving control of the vehicle is performed, and the autonomous driving control is basically performed only when the vehicle is traveling in the autonomous driving section. Other sections may be set as an autonomous driving section. For example, a national expressway, an urban expressway, an exclusive automobile road, a toll road, or a local road may be set as an autonomous driving section. Autonomous driving control is not always performed when the vehicle travels in an autonomous driving section, but is performed only when autonomous driving control is selected by the user and only in a situation where it is appropriate for the vehicle to travel by autonomous driving control. Namely, the autonomous driving section is a section where autonomous driving control of the vehicle is permitted in addition to manual driving.

In the navigation system 1 of the embodiment, whether the vehicle travels by autonomous driving control or by manual driving using user's driving maneuvers particularly in autonomous driving sections where autonomous driving control of the vehicle is permitted can be selected in advance at the time a route search is conducted. If traveling by autonomous driving control is selected for autonomous driving sections, the navigation system 1 conducts a route search by using the autonomous driving cost table 32, or a cost table for autonomous driving control, which is set such that a route that is more suitable for traveling by autonomous driving control has a lower cost value. If traveling by manual driving is selected for autonomous driving sections, the navigation system 1 conducts a route search by using the manual driving cost table 33, namely a cost table for normal manual driving in which autonomous driving control is not considered.

Figure 2:
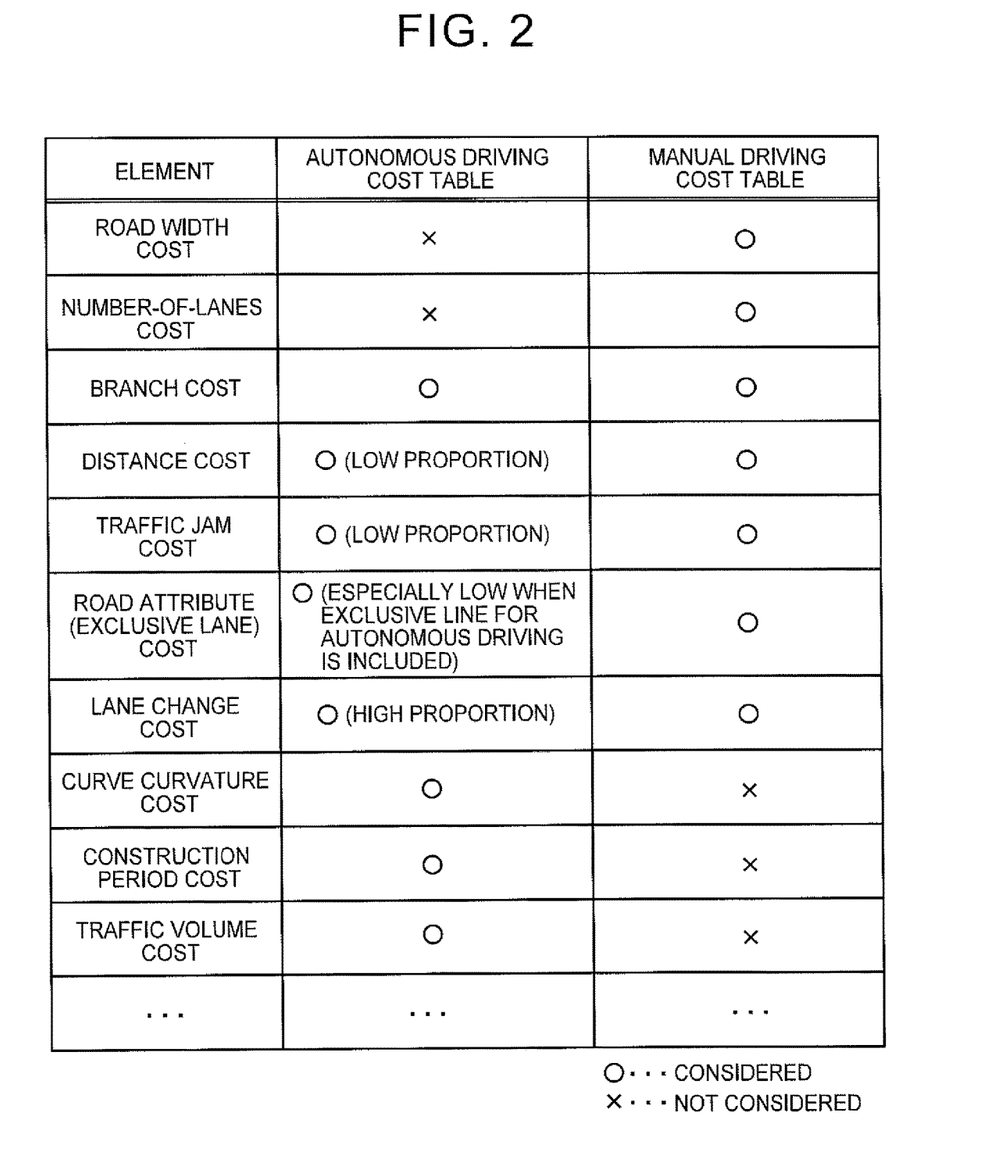
FIG. 2 is a diagram showing comparison between an autonomous driving cost table and a manual driving cost table.

FIG. 2 is a diagram showing comparison between the autonomous driving cost table 32 and the manual driving cost table 33. As shown in FIG. 2, the autonomous driving cost table 32 and the manual driving cost table 33 include a plurality of elements for calculating a cost value. The sum of values specified for each element is calculated as a cost value, and a route with the lowest cost value is selected as a recommended route as described below (S2, S4 in FIG. 5). The autonomous driving cost table 32 and the manual driving cost table 33 have some common elements, but there are also elements that are included in only one of the autonomous driving cost table 32 and the manual driving cost table 33. For example, branch cost for preferentially selecting a route with fewer branches (right and left turns) as a recommended route, distance cost for preferentially selecting a shorter route as a recommended route, traffic jam cost for preferentially selecting a less congested route as a recommended route, road attribute cost for preferentially selecting a road attribute more suitable for traveling of the vehicle as a recommended route, lane change cost for preferentially selecting a route requiring fewer lane changes at a junction JCT, an interchange IC, etc. as a recommended route are the common elements. Curve curvature cost for preferentially selecting a route comprised of a road with no curve or a route including a road with a curve having smaller curvature (a larger radius of curvature R) as a recommended route, construction period cost for preferentially selecting a route including a more recently constructed section as a recommended route, and traffic volume cost for preferentially selecting a road with lower traffic volume as a recommended route are the elements included in only the autonomous driving cost table 32. Road width cost for preferentially selecting a route with a greater road width as a recommended route and number-of-lanes cost for preferentially selecting a route with a larger number of lanes as a recommended route are the elements included in only the manual driving cost table 33. In particular, (A) road attribute cost, (B) lane change cost, (C) curve curvature cost, (D) construction period cost, and (E) traffic volume cost in the autonomous driving cost table 32 correspond to autonomous driving determination elements for determining if the route is suitable for traveling by autonomous driving control.

The autonomous driving determination elements (A) to (E) will be particularly described in more detail below.

(A) A route including an exclusive lane for traveling by autonomous driving control (hereinafter referred to as the "exclusive autonomous driving lane") is a route along which the vehicle travels on a road designed on the assumption that vehicles travel by autonomous drive control. It can therefore be estimated that the vehicle can appropriately travel by autonomous driving control along this route. Accordingly, a road including an exclusive autonomous driving lane has a lower road attribute cost value. As a result, a route including an exclusive autonomous driving lane is preferentially selected as a recommended route.

(B) A route requiring many lane changes at a JCT, an IC, etc. requires complicated driving maneuvers. A vehicle therefore cannot appropriately travel along this route by autonomous driving control. That is, autonomous driving control may be interrupted. Accordingly, a road requiring fewer lane changes has a lower lane change cost value. As a result, a route requiring fewer lane changes is preferentially selected as a recommended route.

Figure 3:
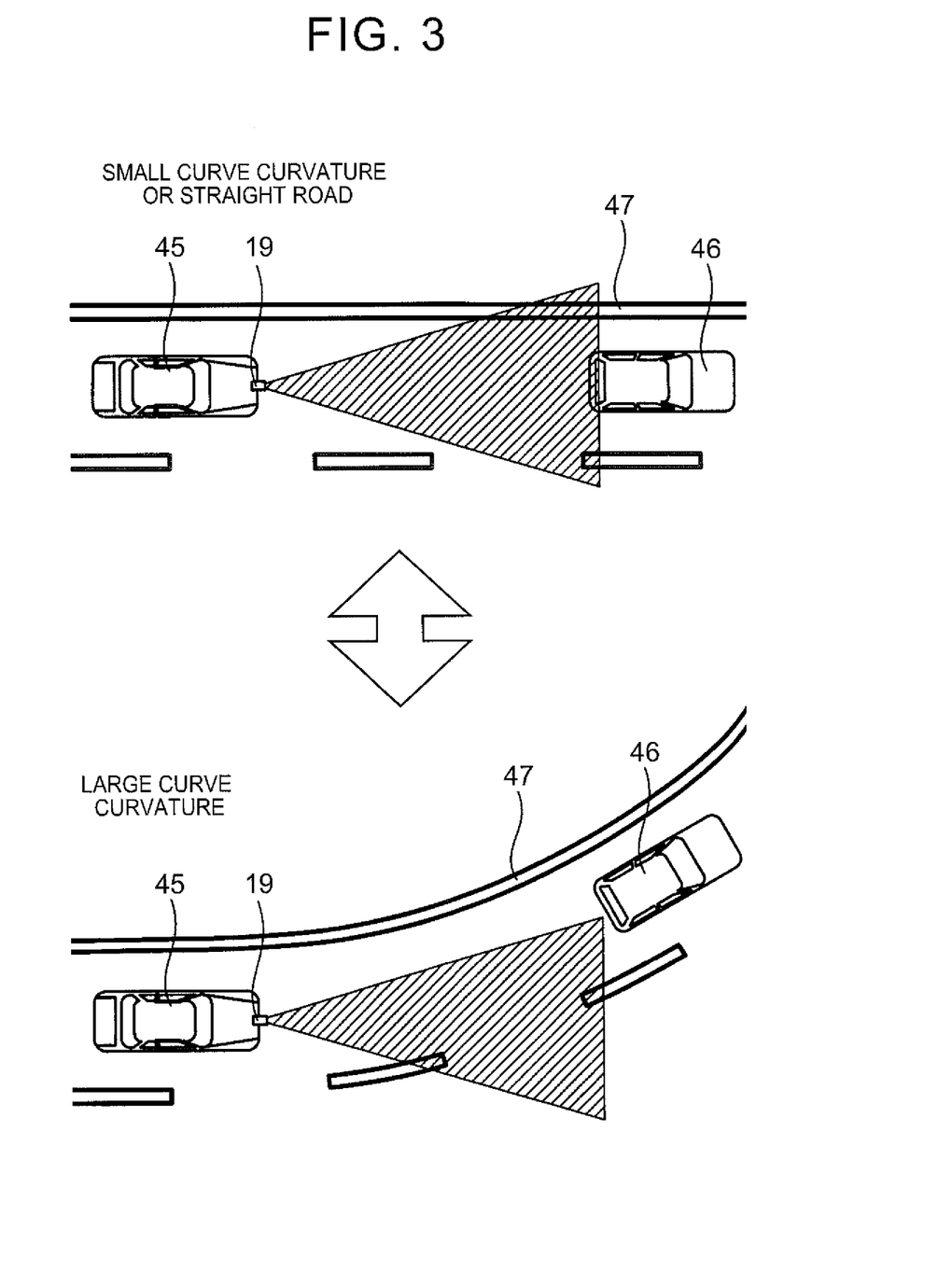
FIG. 3 is a diagram illustrating the level of suitability for traveling by autonomous driving control.

(C) It is difficult to detect pavement markings or other vehicles on a road with large curvature (a small radius of curvature R) by the external camera 19 or a sensor. A vehicle therefore cannot appropriately travel on such a road by autonomous driving control. That is, autonomous driving control may be interrupted. For example, in the case where a vehicle 45 detects other vehicles 46 and pavement markings 47 by the external camera 19 as shown in FIG. 3, a detection region ahead of the vehicle 45 in the traveling direction is smaller on a road with larger curvature than on a straight road or a road with smaller curvature. In particular, in the case where there are walls installed on both sides of a road like a freeway, the detection region is smaller as it is blocked by the walls. Accordingly, a road with no curve has the lowest curve curvature cost value, and for roads with a curve, a road with a curve having smaller curvature has a lower curve curvature cost value. As a result, a route comprised of a road with no curve or a route including a road with a curve having smaller curvature is preferentially selected as a recommended route.

Figure 4:
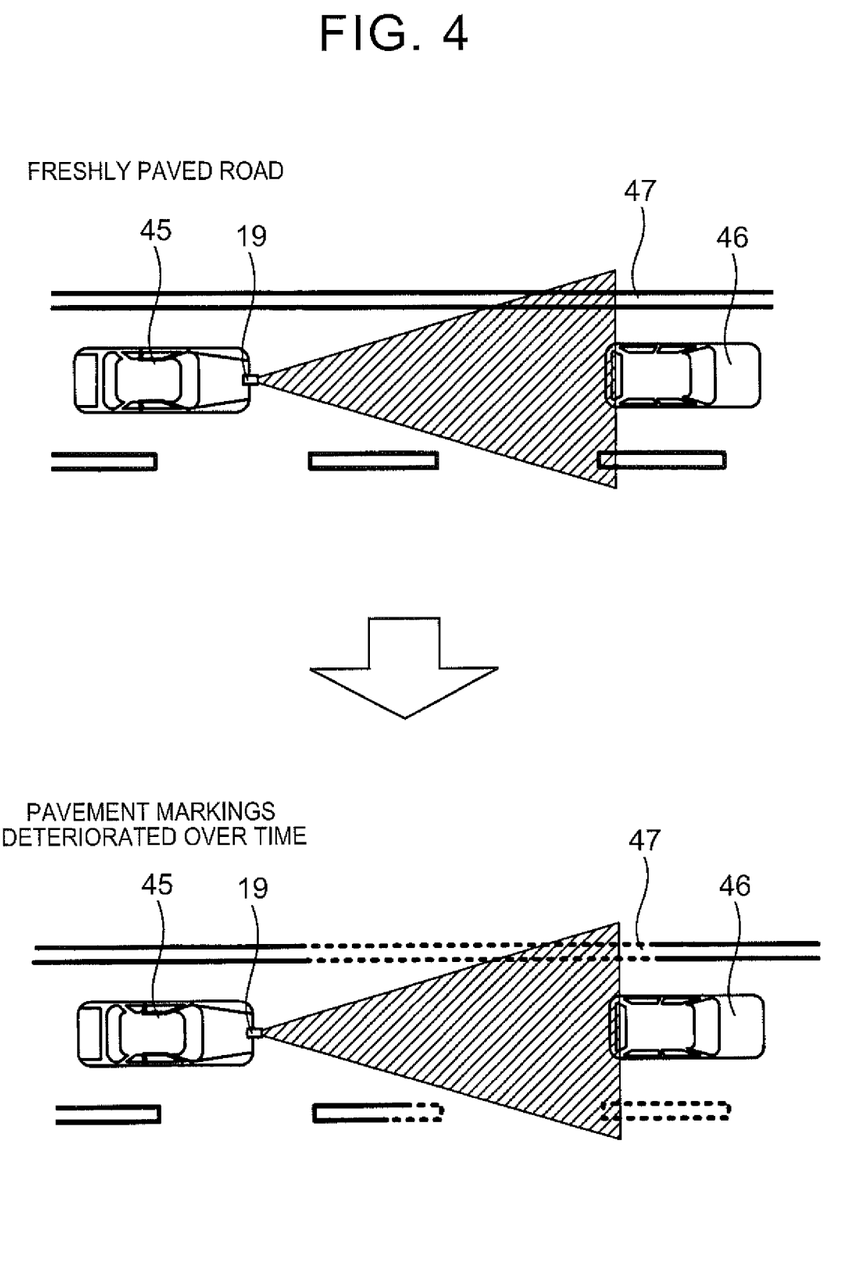
FIG. 4 is a diagram illustrating the level of suitability for traveling by autonomous driving control.

(D) In order to detect pavement markings by the external camera 19, it is important that pavement markings on the road surfaces are clear. However, even if the pavement markings on the roads are clear immediately after pavement construction, they are gradually worn away and deteriorated as vehicles repeatedly travel on the road surfaces. A vehicle cannot appropriately travel on a road with a deteriorated pavement marking by autonomous driving control as it is difficult to detect the pavement marking by the external camera 19. That is, autonomous driving control may be interrupted. For example, in the case where the vehicle 45 detects the pavement markings 47 by the external camera 19 as shown in FIG. 4, it cannot accurately detect the positions and shapes of the pavement markings 47 by processing of an image captured by the external camera 19, if the pavement markings 47 have been deteriorated. Accordingly, a more recently constructed road has a lower construction period cost value. As a result, a route including a more recently constructed section, namely a section where pavement markings are estimated to be clear, is preferentially selected as a recommended route.

(E) A road with lower traffic volume has a lower traffic volume cost value in order to prevent an interruption of autonomous driving control due to failure to detect a pavement marking as in the case of the construction period cost. As a result, a route with lower traffic volume, namely a route in which pavement markings are estimated to be clear, is preferentially selected as a recommended route.

Although (A) to (E) are shown as the autonomous driving determination elements in the present embodiment, the navigation system 1 need not necessarily use all of the elements (A) to (E), and may use only a part of the elements (e.g., (A) to (C)). The autonomous driving determination elements may be prioritized. For example, the navigation system 1 may first conduct a route search by using only (A) to (C), and if it cannot narrow down recommended routes to one, it may conduct a route search by using (D) or (E).

The autonomous driving cost table 32 is set such that the distance cost, the traffic jam cost, the road width cost, and the number-of-lanes cost account for a lower proportion of the overall cost value (in particular, the proportions of the road width cost and the number-of-lanes cost are "0") and such that the lane change cost accounts for a higher proportion of the overall cost value, as compared to the manual driving cost table 33. As a result, in the case where traveling by autonomous driving control is selected for autonomous driving sections and a route search is conducted based on this selection, the cost value is calculated by taking more into consideration whether the route is suitable for traveling by autonomous driving control or not, as compared to the case where traveling by manual driving is selected for autonomous driving sections and a route search is conducted based on this selection. The route search process using the autonomous driving cost table 32 and the manual driving cost table 33 will be described in detail later.

The navigation electronic control unit (ECU) 13 is an electronic control unit that generally controls the navigation system 1. The navigation ECU 13 includes: a CPU 41 as an arithmetic unit and a control unit; and internal storage media such as a RAM 42 that is used as a working memory when the CPU 41 performs various arithmetic operations and that stores route data etc. when a route search is conducted, a ROM 43 having recorded thereon a route search process program (see FIG. 5) described below etc. in addition to a control program, and a flash memory 44 that stores a program read from the ROM 43. The navigation ECU 13 forms various means as a processing algorithm. For example, cost calculating means calculates a cost value by using the cost table for autonomous driving control which is set such that a route that is more suitable for traveling by autonomous driving control has a lower cost value. Recommended route searching means searches for a recommended route based on the cost value calculated by the cost calculating means. Drive mode selecting means selects whether the vehicle travels by autonomous driving control or manual driving using user's driving maneuvers in autonomous driving sections. Control content setting means sets the content of autonomous driving control to be performed on the vehicle in an autonomous driving section included in the recommended route searched for by the recommended route searching means.

The operation unit 14 is operated to enter a point of departure as a start point and a destination as an end point etc., and is formed by a plurality of operation switches (not shown) such as various keys and buttons. The navigation ECU 13 performs control so as to execute various operations based on switch signals output in response to depression etc. of the switches. The operation unit 14 may be formed by a touch panel that is provided on the front surface of the liquid crystal display 15. Alternatively, the operation unit 14 may be formed by a microphone and a speech recognition device.

A map image including a road, traffic information, operation guidance, an operation menu, key guidance, a recommended route from a point of departure to a destination searched for by a route search, various information on the recommended route, guidance information according to a guide route (the recommended route in the case where the recommended route is selected as a guide route), news, a weather forecast, time, an email, a TV program, etc. are displayed on the liquid crystal display 15. An HUD or an HMD may be used instead of the liquid crystal display 15.

The speaker 16 outputs voice guidance that tells the user the directions along a guide route based on a command from the navigation ECU 13, and guidance of traffic information.

The DVD drive 17 is a drive that can read data recorded on a recording medium such as a DVD or a CD. The DVD drive 17 plays music or images, updates the map information DB 31, etc. based on the read data.

The communication module 18 is a communication device that receives traffic information, probe information, weather information, etc. transmitted from a traffic information center such as, e.g., a VICS center or a probe center. For example, the communication module 18 is a mobile phone or a DCM. Examples of the communication module 18 further include a vehicle-to-vehicle communication device for communication between vehicles, and a road-to-vehicle communication device for communication between a vehicle and a roadside unit.

The external camera 19 is, e.g., a camera using a solid state imaging element such as a CCD. The external camera 19 is attached to the vehicle at a position above a front bumper and is mounted such that its optical axis is tilted downward at a predetermined angle with respect to the horizontal direction. The external camera 19 captures an image ahead of the vehicle in the traveling direction when the vehicle travels in an autonomous driving section. The vehicle control ECU 20 processes the captured image to detect pavement markings applied to the road on which the vehicle is traveling, other vehicles around, etc., and performs autonomous driving control of the vehicle based on the detection result. The external camera 19 may be placed on the rear or side part of the vehicle instead of on the front part of the vehicle. Instead of the camera, a sensor such as a millimeter wave radar, vehicle-to-vehicle communication, or road-to-vehicle communication may be used as means for detecting other vehicles.

The vehicle control ECU 20 is an electronic control unit that controls the vehicle equipped with the navigation system 1. The vehicle control ECU 20 is connected to each driving part of the vehicle such as steering, a brake, and an accelerator. In the first embodiment, the vehicle control ECU 20 controls each driving part to perform autonomous driving control of the vehicle particularly when the vehicle travels in an autonomous driving section. The navigation ECU 13 sends a command signal regarding autonomous driving control to the vehicle control ECU 20 via a CAN when a planned route (guide route) of the vehicle has been decided. The vehicle control ECU 20 performs autonomous driving control after the start of traveling according to the received command signal. The command signal contains information that specifies the planned route (guide route) and information that shows the set content of autonomous driving control (e.g., travel straight, make a lane change to the right, merge, etc.) to be performed on the vehicle in an autonomous driving section included in the planned route.

Figure 5:
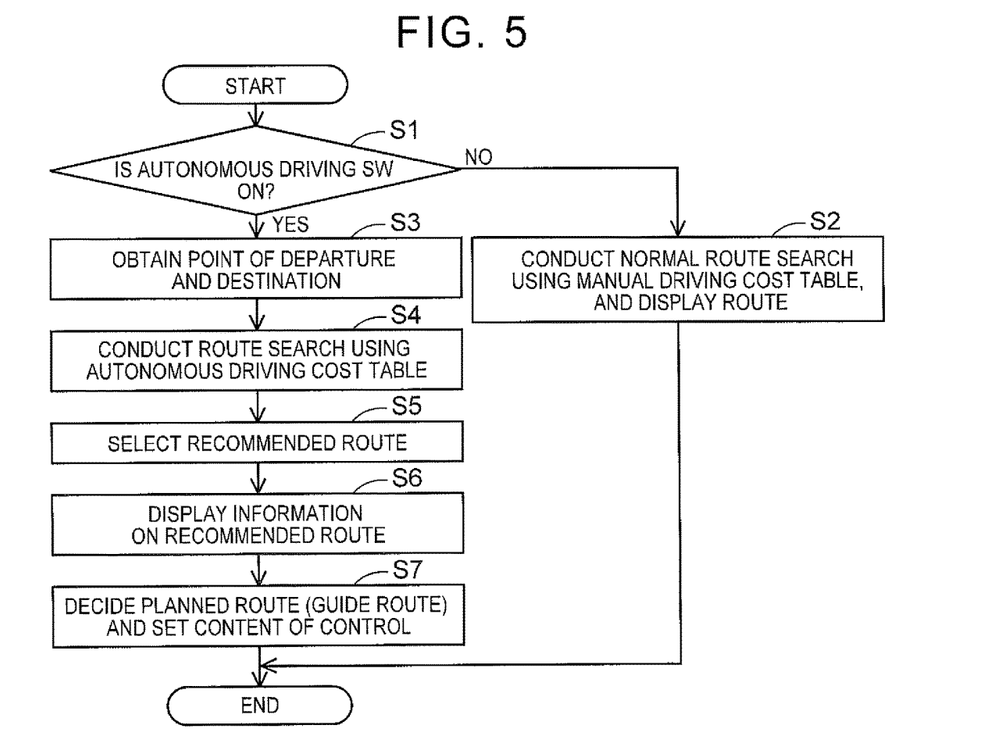
FIG. 5 is a flowchart of a route search process program according to the embodiment.

Next, the route search process program that is executed by the CPU 41 in the navigation system 1 of the embodiment having the above configuration will be described with reference to FIG. 5. FIG. 5 is a flowchart of the route search process program according to the embodiment. The route search process program is a program that is executed in response to a predetermined operation performed to conduct a route search in the navigation system 1, and that searches for a recommended route from a point of departure to a destination. The program shown in the flowchart of FIG. 5 is stored in the RAM 42 and the ROM 43 of the navigation system 1 and is executed by the CPU 41.

In the route search program, the CPU 41 first determines in step (hereinafter abbreviated as "S") 1 if the autonomous driving switch is ON. The autonomous driving switch is a switch that allows the user to select whether the vehicle basically travels by autonomous driving control or by manual driving without autonomous driving control in autonomous driving sections. The autonomous driving switch is disposed on an instrument panel etc.

If the CPU 41 determines that the autonomous driving switch is ON (S1: YES), the routine proceeds to S3. If the CPU 41 determines that the autonomous driving switch is OFF (S1: NO), the routine proceeds to S2.

That is, if the CPU 41 determines that the autonomous driving switch is ON, the user desires that the vehicle travel by autonomous driving control in autonomous driving sections. Accordingly, in S3 and the subsequent steps, the CPU 41 searches for a recommended route from a point of departure to a destination on the assumption that the vehicle basically travels by autonomous driving control in autonomous driving sections.

If the CPU 41 determines that the autonomous driving switch is OFF, the user desires that the vehicle travel by manual driving in autonomous driving sections rather than by autonomous driving control. Accordingly, in S2, the CPU 41 searches for a recommended route from a point of departure to a destination on the assumption that the vehicle travels by manual driving in autonomous driving sections. The process of searching for a recommended route in S2 is similar to a common route search process in which autonomous driving control is not considered. Specifically, the CPU 41 calculates a cost value by using known Dijkstra's algorithm and the manual driving cost table 33. The CPU 41 decides a route with the lowest cost value as a recommended route. In addition to the recommended route, the CPU 41 also displays other route options searched for under different search conditions (e.g., routes according to the preferences of shortest distance, local roads, and toll roads) on the liquid crystal display 15.

Figure 6:
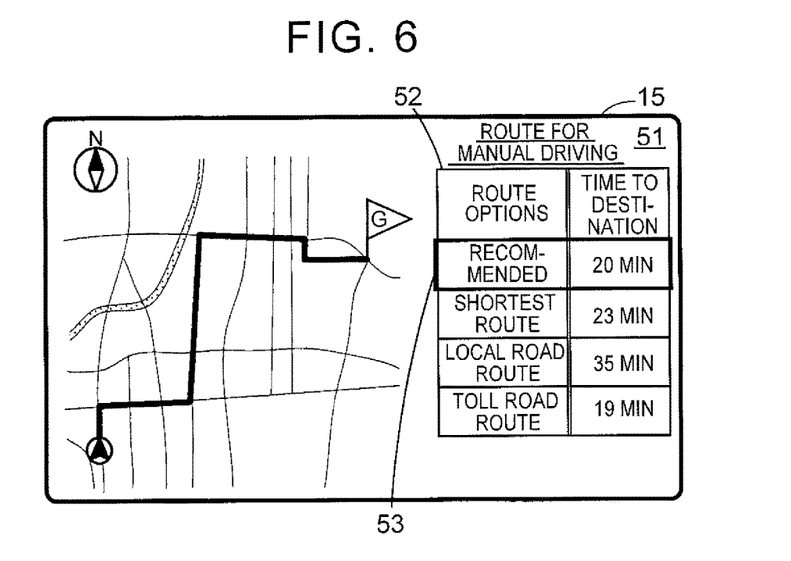
FIG. 6 is a diagram of a route guidance screen showing a recommended route, which is displayed on a liquid crystal display when traveling by manual driving is selected.

FIG. 6 is a diagram showing a route guidance screen 51 that is displayed on the liquid crystal display 15 in S2. An information window 52, which shows a list of information on each of the recommended route and the routes searched for under different search conditions from the recommended route (e.g., routes according to the preferences of shortest distance, local roads, and toll roads), is displayed on the route guidance screen 51. In particular, the route selected with a cursor 53 on the information window 52 is superimposed and displayed on the map image on the left side of the screen. Although the route options other than the recommended route are also displayed in the example of FIG. 6, only the recommended route may be displayed. The user selects a planned route (guide route) of the vehicle from the provided routes. Thereafter, the navigation system 1 provides the user with traveling guidance based on the selected planned route.

In S3, the CPU 41 obtains a point of departure and a destination. The point of departure may be the current location of the vehicle or may be any point designated by the user (e.g., user's house). The CPU 41 obtains the destination based on user's operation accepted by the operation unit 14 (e.g., an operation of searching for or selecting a facility).

Subsequently, in S4, the CPU 41 searches for a recommended route from the point of departure to the destination on the assumption that the vehicle travels by autonomous driving control in autonomous driving sections. In particular, in the route search of S4, the CPU 41 calculates a cost value by using known Dijkstra algorithm and the autonomous driving cost table 32 (FIG. 2). Specifically, the CPU 41 conducts route searches from both the point of departure and the destination and calculates, based on the autonomous driving cost table 32, the sum of the cost value accumulated from the point of departure and the cost value accumulated from the destination (the cost value sum) at the point where the search from the point of departure meets the search from the destination. In S5, the CPU 41 specifies a route with the smallest cost value sum as a route option.

The autonomous driving cost table 32 includes (A) road attribute cost, (B) lane change cost, (C) curve curvature cost, (D) construction period cost, and (E) traffic volume cost as the autonomous driving determination elements for determining if the route is suitable for traveling by autonomous driving control, as described above (see FIG. 2). Accordingly, a route that is more suitable for traveling by autonomous driving control, such as a route including an exclusive autonomous driving lane, a route requiring fewer lane changes, a route comprised of a road with no curve or a route including a road with a curve having smaller curvature, or a route including a more recently constructed section or a section with lower traffic volume (i.e., a route in which pavement markings are estimated to be clear), has a lower cost value. The autonomous driving cost table 32 is set such that the distance cost, the traffic jam cost, the road width cost, and the number-of-lanes cost account for a lower proportion of the overall cost value and such that the lane change cost accounts for a higher proportion of the overall cost value, as compared to the manual driving cost table 33. As a result, the cost value is calculated by taking more into consideration whether the route is suitable for traveling by autonomous driving control or not, as compared to the manual driving cost table 33. Accordingly, a route search can be conducted in view of the level of suitability for traveling by autonomous driving control.

Figure 7:
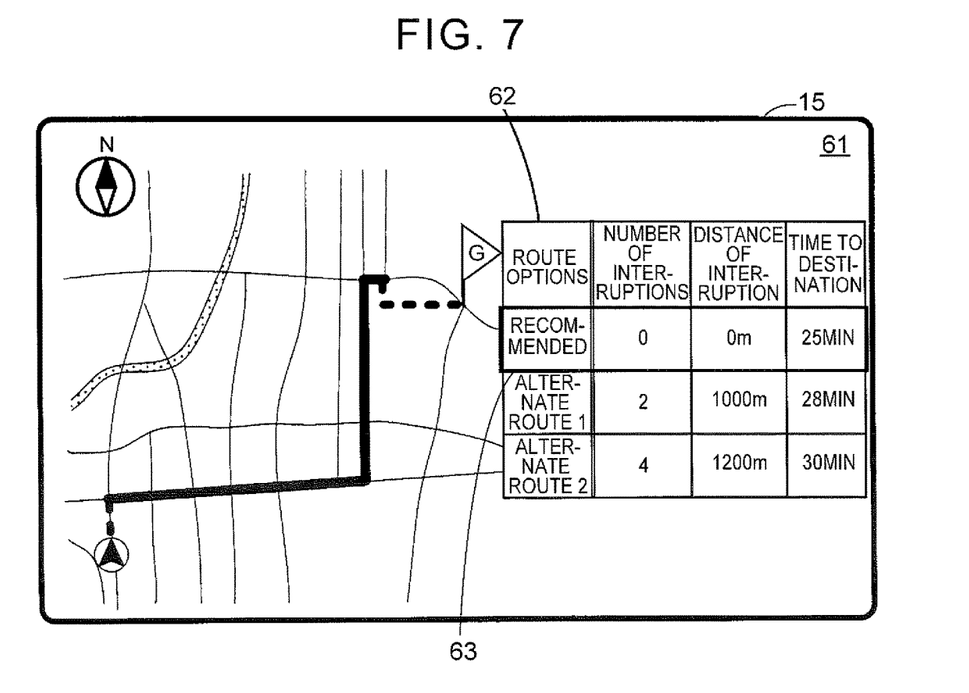
FIG. 7 is a diagram of a route guidance screen showing a recommended route, which is displayed on the liquid crystal display when traveling by autonomous driving control is selected.

Thereafter, in S6, the CPU 41 provides information on the recommended route selected in S5. The CPU 41 may provide only the information on the recommended route, or may provide information on other route options not selected as a recommended route (e.g., routes with the second and third smallest cost value sums). FIG. 7 is a diagram showing a route guidance screen 61 that is displayed on the liquid crystal display 15 in S6. An information window 62, which shows a list of information on each of the recommended route and other route options not selected as a recommended route, is displayed on the route guidance screen 61. In particular, the route selected with a cursor 63 on the information window 62 is superimposed and displayed on the map image on the left side of the screen. In the case where the route superimposed and displayed on the map image includes an autonomous driving section, a section corresponding to the autonomous driving section are displayed so as to be distinguished from other sections that are not corresponding to the autonomous driving sections. For example, in the example of FIG. 7, the autonomous driving section is shown by a solid line, and the sections other than the autonomous driving section are shown by dashed lines. It is desirable that, in addition to the time to destination, an estimated number of interruptions of autonomous driving control, the distance of interruption, etc., be displayed on the information window 62. Although the route options other than the recommended route are also displayed in the example of FIG. 7, only the recommended route may be displayed. The number of interruptions and the distance of interruption may not be displayed on the information window 62.

Subsequently, in S7, the CPU 41 decides, from the routes provided in S6, a planned route (guide route) of the vehicle based on user's operation. The CPU 41 may decide the recommended route as the planned route without letting the user to choose. The CPU 41 then sets the content of autonomous driving control (e.g., travel straight, make a lane change to the right, merge, etc.) to be performed on the vehicle in an autonomous driving section included in the planned route.

Figure 8:
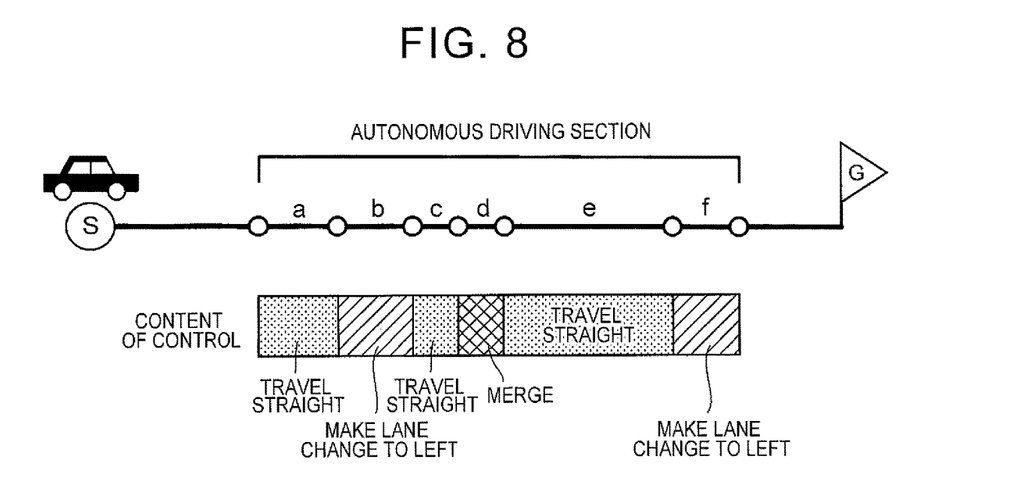
FIG. 8 is a diagram showing an example of the content of autonomous driving control that is set for a planned route of a vehicle.

For example, FIG. 8 is a diagram showing an example of the content of autonomous driving control that is set in the case where sections a to f of the planned route of the vehicle are autonomous driving sections. In the example shown in FIG. 8, the content of autonomous driving control are set for the sections a to f. The content of autonomous driving control is basically decided based on the planned route and map information. For example, for a section where the vehicle needs to merge onto a mainline at an IC etc., "merge" is set as the content of autonomous driving control. Moreover, "make a lane change to the right (left)" is set for a section where the vehicle needs to make a lane change in order to move to other freeway or local road at a JCT, an IC, etc. The CPU 41 sends information specifying the planned route and the set content of autonomous driving control to the vehicle control ECU 20 via the CAN. Accordingly, when the vehicle starts traveling, the vehicle control ECU 20 performs autonomous driving control after the start of traveling according to the information received from the navigation system 1.

As described above in detail, in the navigation system 1 of the embodiment, a route search method using the navigation system 1, and a computer program that is executed by the navigation system 1, in the case where the navigation system 1 searches for a recommended route from a point of departure to a destination including an autonomous driving section where autonomous driving control of the vehicle is permitted, the navigation system 1 calculates a cost value by using the autonomous driving cost table 32 set such that a route that is more suitable for traveling by autonomous driving control has a lower cost value, and searches for a recommended route based on the calculated cost value (S5). Accordingly, the navigation system 1 can conduct a route search in view of the level of suitability for traveling by autonomous driving control. The navigation system 1 can thus provide a recommended route that allows the vehicle to travel by autonomous driving control and that prevents an event disadvantageous for the user, such as an interruption of autonomous driving control, from occurring.

It should be understood that the above embodiment need not be limiting, and various improvements and modifications can be made without departing from the spirit and scope.

For example, in the embodiment, a route search is conducted when the vehicle starts traveling. However, the autonomous driving start button for starting autonomous driving can be depressed while the vehicle is traveling by manual driving in an autonomous driving section. In this case, the processes of S3 and the subsequent steps are performed. The point of departure is the current location of the vehicle, and if a destination has already been set in the navigation system 1, this destination is used as a destination. If no destination has been set, a point located away from the current location of the vehicle by a predetermined distance along the road is set as a destination.

In the embodiment, the navigation system 1 sets the content of autonomous driving control (e.g., travel straight, make a lane change to the right, merge, etc.) to be performed on the vehicle. However, the vehicle control ECU 20 may set the content of autonomous driving control. The content of autonomous driving control need not necessarily be set at the time a route search is conducted. The content of autonomous driving control need only be set by the time the vehicle reaches an autonomous driving section.

In the embodiment, a control process in which the vehicle control ECU 20 controls all of an accelerator operation, a brake operation, and a steering wheel operation, which are the maneuvers related to the behavior of the vehicle out of vehicle maneuvers, is described as autonomous driving control that is performed such that the vehicle travels autonomously without user's driving maneuvers. However, autonomous driving control may be a control process in which the vehicle control ECU 20 controls at least one of the accelerator operation, the brake operation, and the steering wheel operation, which are the maneuvers related to the behavior of the vehicle out of the vehicle maneuvers. Manual driving using user's driving maneuvers is described as a control process in which the user performs all of the accelerator operation, the brake operation, and the steering wheel operation, which are the maneuvers related to the behavior of the vehicle out of the vehicle maneuvers.

In the embodiment, the navigation system 1 executes the route search process program (FIG. 5). However, the vehicle control ECU 20 may execute the route search process program. In this case, the vehicle control ECU 20 obtains the current location of the vehicle, map information, traffic information, etc. from the navigation system 1.

Devices having a route search function can be used, in addition to navigation systems. For example, embodiments may include a mobile phone, a smartphone, a tablet computer, a personal computer, etc. (hereinafter referred to as the "mobile terminal etc."). Systems formed by a server and the mobile terminal, etc, can be uses as well. In this case, each step of the above route search process program (FIG. 5) may be performed by either the server or the mobile terminal etc. When using the mobile terminal etc., a vehicle capable of performing autonomous driving control and the mobile terminal etc. need be connected (either wired or wireless) such that they can communicate with each other.

Although the embodiment of the route search system is described above, the route search system may have the following configurations. In that case, the route search system has the following effects.

For example, a first configuration is as follows.

A route search system that searches for a recommended route in the case where a vehicle travels by autonomous driving control in an autonomous driving section where autonomous driving control of the vehicle is permitted is characterized by including: cost calculating means for calculating a cost value by using a cost table for autonomous driving control which is set such that a route that is more suitable for traveling by autonomous driving control has a lower cost value; and recommended route searching means for searching for the recommended route based on the cost value calculated by the cost calculating means.

The route search system having the above configuration can conduct a route search in view of the level of suitability for traveling by autonomous driving control. The route search system can thus provide a recommended route that allows the vehicle to travel by autonomous driving control and that prevents an event disadvantageous for the user, such as an interruption of autonomous driving control, from occurring.

A second configuration is as follows.

The route search system is characterized in that the cost table for autonomous driving control includes a plurality of elements for calculating the cost value, a sum of values specified for each of the elements is calculated as the cost value, and the plurality of elements include an autonomous driving determination element for determining if a route is suitable for traveling by autonomous driving control.

The route search system having the above configuration can accurately determine if the route is suitable for traveling by autonomous driving control by calculating the cost value by using the autonomous driving determination element.

A third configuration is as follows.

The route search system is characterized in that the cost table for autonomous driving control includes, as the autonomous driving determination element, at least one of exclusive road cost for preferentially selecting a route including an exclusive lane for traveling by autonomous driving control as the recommended route, lane change cost for preferentially selecting a route requiring fewer lane changes as the recommended route, curve curvature cost for preferentially selecting a route comprised of a road with no curve or a route including a road with a curve having smaller curvature as the recommended route, construction period cost for preferentially selecting a route including a more recently constructed section as the recommended route, and traffic volume cost for preferentially selecting a route with lower traffic volume as the recommended route.

The route search system having the above configuration can preferentially select a route including an exclusive autonomous driving lane, a route requiring fewer lane changes, a route comprised of a road with no curve or a route including a road with a curve having smaller curvature, or a route including a more recently constructed section or a section with lower traffic volume (i.e., a route in which pavement markings are estimated to be clear) as the recommended route. Accordingly, a route that is more suitable for traveling by autonomous driving control can be selected as the recommended route.

A fourth configuration is as follows.

The route search system is characterized in that, in the case where the vehicle travels by autonomous driving control in the autonomous driving section, the cost calculating means calculates the cost value by using the cost table for autonomous driving control, and in the case where the vehicle travels by manual driving using user's driving maneuvers in the autonomous driving section, the cost calculating means calculates the cost value by using a cost table for manual driving which is different from the cost table for autonomous driving control.

The route search system having the above configuration can search for an appropriate route for each drive mode.

A fifth configuration is as follows.

The route search system is characterized by further including: drive mode selecting means for selecting whether the vehicle travels by autonomous driving control or manual driving using user's driving maneuvers in the autonomous driving section, wherein if traveling by autonomous driving control is selected for the autonomous driving section, the cost calculating means calculates the cost value by using a cost table for autonomous driving control, and if traveling by manual driving is selected for the autonomous driving section, the cost calculating means calculates the cost value by using the cost table for manual driving which is different from the cost table for autonomous driving control.

The route search system having the above configuration can not only search for the recommended route on the assumption that the vehicle travels by autonomous driving control in the autonomous driving section but also search for the recommended route on the assumption that the vehicle travels by manual traveling in the autonomous driving section. This increases route options from which the user can choose and allows the user to select a more appropriate route regardless of the drive mode of the vehicle. Since the cost table to be used for a route search is different depending on the selected drive mode, the route search system can search for an appropriate route for each drive mode.

A sixth configuration is as follows.

The route search system is characterized in that the cost table for autonomous driving control and the cost table for manual driving include, as elements for calculating the cost value, at least one of distance cost for preferentially selecting a shorter route as the recommended route, traffic jam cost for preferentially selecting a less congested route as the recommended route, road width cost for preferentially selecting a route with a greater road width as the recommended route, and number-of-lanes cost for preferentially selecting a route with a larger number of lanes as the recommended route, wherein in the cost table for autonomous driving control, the distance cost, the traffic jam cost, the road width cost, and the number-of-lanes cost account for a lower proportion of the cost value, as compared to the cost table for manual driving.

According to the route search system having the above configuration, in the case where traveling by autonomous driving control is selected for the autonomous driving section and a route search is conducted based on this selection, the route search system can calculate the cost value by taking more into consideration whether the route is suitable for traveling by autonomous driving control or not, as compared to the case where traveling by manual driving is selected for the autonomous driving section and a route search is conducted based on this selection.

A seventh configuration is as follows.

The route search system is characterized in that the cost table for autonomous driving control and the cost table for manual driving include, as the elements for calculating the cost value, a common element that is considered in both of the tables, an element that is considered in only the cost table for autonomous driving control, and an element that is considered in only the cost table for manual driving, and the cost table for autonomous driving control is set such that the common element accounts for a lower proportion of the overall cost value, as compared to the cost table for manual driving.

The route search system having the above configuration uses different elements for the cost table for manual driving and for the cost table for manual driving to calculate the cost value. Accordingly, the route search system can accurately determine the level of suitability of the route based on the reference according to the selected drive mode.

An eighth configuration is as follows.

The route search system is characterized by further including: control content setting means for setting a content of the autonomous driving control to be performed on the vehicle in the autonomous driving section included in the recommended route searched for by the recommended route searching means.

The route search system having the above configuration makes it possible to set the content of autonomous driving control to be performed on the vehicle when the vehicle travels on the recommended route. Accordingly, the content of autonomous driving control need not be set during traveling of the vehicle, which can reduce the burden of the process associated with autonomous driving control.

A ninth configuration is as follows.

The route search system is characterized in that the cost table for autonomous driving control is set such that a route including an exclusive lane for traveling by autonomous driving control has a lower cost value.

The route search system having the above configuration can calculate the cost value such that the route that is more suitable for traveling by autonomous driving control has a lower cost value.

A tenth configuration is as follows.

The route search system is characterized in that the cost table for autonomous driving control is set such that a route requiring fewer lane changes has a lower cost value.

The route search system having the above configuration can calculate the cost value such that the route that is more suitable for traveling by autonomous driving control has a lower cost value.

An eleventh configuration is as follows.

The route search system is characterized in that the cost table for autonomous driving control is set such that a route with no curve has the lowest cost value, and for routes with a curve, a route with a curve having smaller curvature has a lower cost value.

The route search system having the above configuration can calculate the cost value such that the route that is more suitable for traveling by autonomous driving control has a lower cost value.

A twelfth configuration is as follows.

The route search system is characterized in that the cost table for autonomous driving control is set such that a route including a more recently constructed section has a lower cost value.

The route search system having the above configuration can calculate the cost value such that the route that is more suitable for traveling by autonomous driving control has a lower cost value.

A thirteenth configuration is as follows.

The route search system is characterized in that the cost table for autonomous driving control is set such that a route with lower traffic volume has a lower cost value.

The route search system having the above configuration can calculate the cost value such that the route that is more suitable for traveling by autonomous driving control has a lower cost value.

The invention claimed is:

1. A vehicle navigation route search system that searches for a recommended route in a case where a vehicle travels by autonomous driving control in an autonomous driving section where autonomous driving control of the vehicle is permitted, characterized by comprising:
    a GPS receiver; and
    a processor programmed to:
        receive a current location of the vehicle from the GPS receiver;
        receive an input from a selection device selecting either autonomous driving control or manual driving for driving in the autonomous driving section;
        in the case where autonomous driving control is selected for driving in the autonomous driving section, calculate a cost value by using a cost table for autonomous driving control which is set such that a route that is more suitable for traveling by autonomous driving control has a lower cost value;
        in a case where manual driving is selected for driving in the autonomous driving section, calculate the cost value by using a cost table for manual driving which is different from the cost table for autonomous driving control;
        search for the recommended route based on the received current location and the calculated cost value;
        output the recommended route found by the search on at least one of a speaker and a display screen; and
        set a content of the autonomous driving control to be performed on the vehicle in the autonomous driving section included in the recommended route; wherein:
    the cost table for autonomous driving control and the cost table for manual driving include, as elements for calculating the cost value, a common element that is considered in both of the tables, an element that is considered in only the cost table for autonomous driving control, and an element that is considered in only the cost table for manual driving; and
    the cost table for autonomous driving control is set such that the common element accounts for a lower proportion of an overall cost value, as compared to the cost table for manual driving.

2. The vehicle navigation route search system according to claim 1, wherein:
    the cost table for autonomous driving control includes a plurality of elements for calculating the cost value;
    the processor is programmed to calculate a sum of values specified for each of the elements as the cost value; and
    the plurality of elements include an autonomous driving determination element for determining if a route is suitable for traveling by autonomous driving control.

3. The vehicle navigation route search system according to claim 2, wherein the cost table for autonomous driving control includes, as the autonomous driving determination element, at least one of:
    exclusive road cost for preferentially selecting a route including an exclusive lane for traveling by autonomous driving control as the recommended route;
    lane change cost for preferentially selecting a route requiring fewer lane changes as the recommended route;
    curve curvature cost for preferentially selecting a route comprised of a road with no curve or a route including a road with a curve having smaller curvature as the recommended route;

construction period cost for preferentially selecting a route including a more recently constructed section as the recommended route; and traffic volume cost for preferentially selecting a route with lower traffic volume as the recommended route.

4. The vehicle navigation route search system according to claim 1, wherein:
the cost table for autonomous driving control and the cost table for manual driving include, as elements for calculating the cost value, at least one of:
distance cost for preferentially selecting a shorter route as the recommended route;
traffic jam cost for preferentially selecting a less congested route as the recommended route;
road width cost for preferentially selecting a route with a greater road width as the recommended route; and
number-of-lanes cost for preferentially selecting a route with a larger number of lanes as the recommended route; and
in the cost table for autonomous driving control, the distance cost, the traffic jam cost, the road width cost, and the number-of-lanes cost account for a lower proportion of the cost value, as compared to the cost table for manual driving.

5. The vehicle navigation route search system according to claim 1, wherein:
the cost table for autonomous driving control is set such that a route including an exclusive lane for traveling by autonomous driving control has a lower cost value.

6. The vehicle navigation route search system according to claim 1, wherein:
the cost table for autonomous driving control is set such that a route requiring fewer lane changes has a lower cost value.

7. The vehicle navigation route search system according to claim 1, wherein:
the cost table for autonomous driving control is set such that a route with no curve has the lowest cost value, and for routes with a curve, a route with a curve having smaller curvature has a lower cost value.

8. The vehicle navigation route search system according to claim 1, wherein:
the cost table for autonomous driving control is set such that a route including a more recently constructed section has a lower cost value.

9. The vehicle navigation route search system according to claim 1, wherein:
the cost table for autonomous driving control is set such that a route with lower traffic volume has a lower cost value.

10. A vehicle navigation route search method for searching for a recommended route in a case where a vehicle travels by autonomous driving control in an autonomous driving section where autonomous driving control of the vehicle is permitted, the method comprising:
receiving a current location of the vehicle from a GPS receiver;
receiving an input from a selection device selecting either autonomous driving control or manual driving for driving in the autonomous driving section;
in the case where autonomous driving control is selected for driving in the autonomous driving section, calculating a cost value by using a cost table for autonomous driving control which is set such that a route that is more suitable for traveling by autonomous driving control has a lower cost value;
in a case where manual driving is selected for driving in the autonomous driving section, calculating the cost value by using a cost table for manual driving which is different from the cost table for autonomous driving control;
searching for the recommended route based on the calculated cost value;
outputting the recommended route found by the searching on at least one of a speaker and a display screen; and
setting a content of the autonomous driving control to be performed on the vehicle in the autonomous driving section included in the recommended route; wherein:
the cost table for autonomous driving control and the cost table for manual driving include, as elements for calculating the cost value, a common element that is considered in both of the tables, an element that is considered in only the cost table for autonomous driving control, and an element that is considered in only the cost table for manual driving; and
the cost table for autonomous driving control is set such that the common element accounts for a lower proportion of an overall cost value, as compared to the cost table for manual driving.

11. A computer-readable storage medium storing a vehicle navigation route search computer program that searches for a recommended route in a case where a vehicle travels by autonomous driving control in an autonomous driving section where autonomous driving control of the vehicle is permitted, the program causing a computer to perform functions comprising:
receiving a current location of the vehicle from a GPS receiver;
receiving an input from a selection device selecting either autonomous driving control or manual driving for driving in the autonomous driving section;
in the case where autonomous driving control is selected for driving in the autonomous driving section, calculating a cost value by using a cost table for autonomous driving control which is set such that a route that is more suitable for traveling by autonomous driving control has a lower cost value;
in a case where manual driving is selected for driving in the autonomous driving section, calculating the cost value by using a cost table for manual driving which is different from the cost table for autonomous driving control;
searching for the recommended route based on the calculated cost value;
outputting the recommended route found by the searching on at least one of a speaker and a display screen; and
setting a content of the autonomous driving control to be performed on the vehicle in the autonomous driving section included in the recommended route; wherein:
the cost table for autonomous driving control and the cost table for manual driving include, as elements for calculating the cost value, a common element that is considered in both of the tables, an element that is considered in only the cost table for autonomous driving control, and an element that is considered in only the cost table for manual driving; and
the cost table for autonomous driving control is set such that the common element accounts for a lower proportion of an overall cost value, as compared to the cost table for manual driving.

* * * * *